United States Patent
Jung et al.

(10) Patent No.: US 10,007,149 B2
(45) Date of Patent: Jun. 26, 2018

(54) METHODS OF MANUFACTURING A PHOTOALIGNMENT LAYER AND A LIQUID CRYSTAL DISPLAY

(71) Applicant: Samsung Display Co., Ltd., Yongin-si (KR)

(72) Inventors: Jin-Soo Jung, Hwaseong-si (KR); Suk Hoon Kang, Seoul (KR); In Ok Kim, Osan-si (KR); Jun Woo Lee, Seongnam-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 223 days.

(21) Appl. No.: 15/017,797

(22) Filed: Feb. 8, 2016

(65) Prior Publication Data

US 2016/0306233 A1 Oct. 20, 2016

(30) Foreign Application Priority Data

Apr. 17, 2015 (KR) ........................ 10-2015-0054486

(51) Int. Cl.
*G02F 1/1337* (2006.01)

(52) U.S. Cl.
CPC .. *G02F 1/133711* (2013.01); *G02F 1/133788* (2013.01); *G02F 1/133707* (2013.01);
(Continued)

(58) Field of Classification Search
CPC ........... G02F 1/133711; G02F 1/13378; G02F 1/133788; G02F 1/133345; G02F 1/1368;
(Continued)

(56) References Cited

U.S. PATENT DOCUMENTS

| | | | |
|---|---|---|---|
| 6,063,829 A | 5/2000 | Endou et al. | |
| 2015/0085237 A1* | 3/2015 | Kang ................. | C08G 73/1042 349/127 |
| 2016/0109759 A1* | 4/2016 | Kang ................ | G02F 1/133711 349/43 |

FOREIGN PATENT DOCUMENTS

| | | |
|---|---|---|
| JP | 2008116809 | 5/2008 |
| JP | 2012093642 | 5/2012 |

(Continued)

*Primary Examiner* — Ruiyun Zhang
(74) *Attorney, Agent, or Firm* — Cantor Colburn LLP

(57) ABSTRACT

A method of manufacturing a photoalignment layer includes: applying a photoalignment agent including a copolymer of at least one of cyclobutanedianhydride and a cyclobutanedianhydride derivative, and diamine, and a crosslinking agent including an alkylene group having a formula $-C_nH_{2n}-$, wherein n is a natural number, on a substrate; pre-baking the photoalignment agent applied on the substrate to form a pre-baked photoalignment agent; hard-baking the pre-baked photoalignment agent to form a hard-baked photoalignment agent; irradiating the hard-baked photoalignment agent with a light source thereby photoaligning the photoalignment agent; and secondarily baking the photoalignment agent irradiated with the light source, where in the application of the photoalignment agent on the substrate, the photoalignment agent applied on an edge portion of the substrate is applied in about 30 to about 70 wt %, relative to the photoalignment agent applied on the center portion of the substrate.

20 Claims, 6 Drawing Sheets

(52) U.S. Cl.
CPC ........ *Y10T 428/10* (2015.01); *Y10T 428/1005* (2015.01); *Y10T 428/1023* (2015.01)

(58) Field of Classification Search
CPC ............. G02F 1/133723; Y10T 428/10; Y10T 428/1005; Y10T 428/1018; Y10T 428/1023; C08G 73/10; C08G 73/1007; C08G 73/1046; C08G 73/1064; C09D 179/08; C09K 19/56
USPC ........ 428/1.1, 1.2, 1.25, 1.26; 349/123, 130, 349/132; 427/162; 522/164
See application file for complete search history.

(56) References Cited

FOREIGN PATENT DOCUMENTS

| KR | 1020140032272 | 3/2014 |
| KR | 1020140071225 | 6/2014 |
| KR | 1020140123424 | 10/2014 |

* cited by examiner

METHODS OF MANUFACTURING A PHOTOALIGNMENT LAYER AND A LIQUID CRYSTAL DISPLAY

This application claims priority to Korean Patent Application No. 10-2015-0054486, filed on Apr. 17, 2015, and all the benefits accruing therefrom under 35 U.S.C. § 119, the content of which in its entirety is herein incorporated by reference.

BACKGROUND (a) Field

This invention relates to methods of manufacturing a photoalignment layer and a liquid crystal display, and more particularly, to methods of manufacturing a photoalignment layer and a liquid crystal display where the photoalignment layer has excellent reworkability properties.

(b) Description of the Related Art

In order for a liquid crystal element to facilitate the production of an image, a liquid crystal is switched by an external electric field between transparent conductive glasses. The liquid crystal should be aligned in a certain direction on an interface between the liquid crystal and a transparent conductive glass electrode. A uniform degree of liquid crystal alignment is a useful factor in determining the image quality of a liquid crystal display.

As a conventional method of aligning a liquid crystal in the prior art, there is a rubbing method including applying a polymer film such as polyimide on a substrate such as glass, and rubbing the applied surface in a certain direction with a fiber such as nylon or polyester. However, the rubbing method may generate fine dust or static electricity when fiber and a polymer film are rubbed together, and these may cause a significant problem when manufacturing a liquid crystal panel.

The above information disclosed in this Background section is only for enhancement of understanding of the background of the invention and therefore it may contain information that does not form the prior art that is already known in this country to a person of ordinary skill in the art.

SUMMARY

In order to solve the problem discussed above, a photoalignment method of inducing anisotropy on a polymer film by light irradiation, and aligning a liquid crystal by using the photoalignment method, has been recently researched. This disclosure provides methods of manufacturing a photoalignment layer and a liquid crystal display, having the advantage of excellent reworkability, through adjustment of the physical properties of a photoalignment agent, heat treatment conditions and application conditions of the photoalignment agent, when manufacturing the photoalignment layer.

An exemplary embodiment provides a method of manufacturing a photoalignment layer including: applying a photoalignment agent including a copolymer of at least one of a cyclobutanedianhydride (CBDA), and a cyclobutanedianhydride derivative, and diamine, and a crosslinking agent including an alkylene group having the formula $-C_nH_{2n}-$, wherein n is a natural number, on a substrate; pre-baking the photoalignment agent applied on the substrate to form a pre-baked photoalignment agent; hard-baking the pre-baked photoalignment agent to form a hard-baked photoalignment agent; irradiating the hard-baked photoalignment agent with a light source thereby photoaligning the photoalignment agent; and secondarily baking the photoalignment agent irradiated with the light source, where in the application of the photoalignment agent on the substrate, the photoalignment agent applied on an edge portion of the substrate is applied in about 30 to about 70 wt %, relative to the photoalignment agent applied on a center portion of the substrate.

The photoalignment agent may further include an organic solvent, and be formed to have a viscosity of about 27 to 33 about centipoise (cP).

The pre-baking may be carried out by heat treatment of the photoalignment agent at about 55 to about 65° C. for about 60 to about 80 seconds.

The hard-baking may be carried out by heat treatment of the photoalignment agent at about 200 to about 250° C. for about 1000 to about 1500 seconds.

The irradiation with a light source may be carried out by using ultraviolet rays in a range of about 230 nanometers (nm) to about 380 nm.

The secondary baking may be carried out by heat treatment at about 200 to about 250° C. for about 1000 to about 1500 seconds.

A thickness ratio of the photoalignment layer on the center portion and the edge portion of the substrate may be about 1:1 to about 1:2.

The photoalignment layer of the center portion of the substrate may have a thickness of about 700 to about 900 Å.

The photoalignment layer of the edge portion of the substrate may have a thickness of about 1400 to about 1800 Å.

The photoalignment layer may be removed using a cleaning solution for the photoalignment layer, and the photoalignment layer may be reformed.

The cyclobutanedianhydride may include a compound represented by following Chemical Formula 1, and the cyclobutanedianhydride derivative may include a compound represented by following Chemical Formula 2:

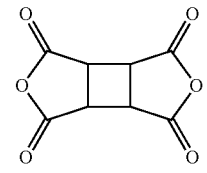

[Chemical Formula 1]

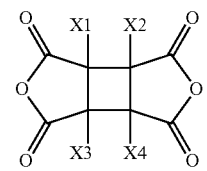

[Chemical Formula 2]

where X1 to X4 are independently of one another hydrogen, halogen or an alkyl group, and at least one of X1 to X4 is not hydrogen.

The diamine may include a compound represented by following Chemical Formula 3:

[Chemical Formula 3]

$H_2N$ — — $NH_2$

The copolymer may include polyamic acid.

The crosslinking agent may include at least one of compounds represented by following Chemical Formulae 6 to 9:

[Chemical Formula 6]

[Chemical Formula 7]

[Chemical Formula 8]

[Chemical Formula 9]

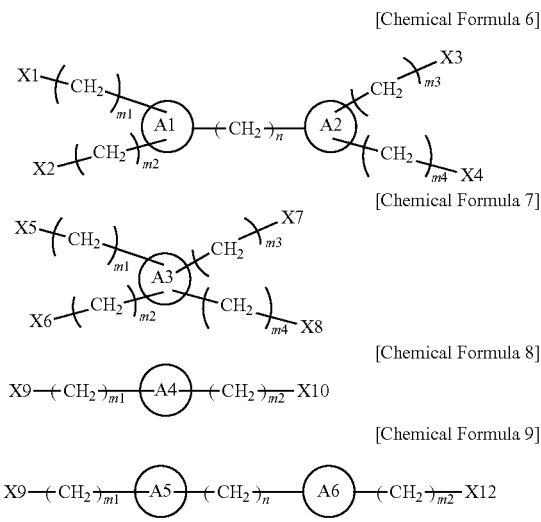

where n is a natural number of 2 to 11; m1 to m4 are independently of one another a natural number of 1 to 4; A1 and A2 are independently of each other

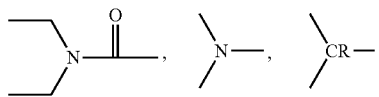

(where R is H or an alkyl group having 1 to 3 carbon atoms), an aromatic compound having 6 to 30 carbon atoms, or an aliphatic cyclic compound having 4 to 20 carbon atoms; A3 is

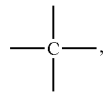

an aromatic compound having 6 to 30 carbon atoms, or an aliphatic cyclic compound having 4 to 20 carbon atoms; A4, A5 and A6 are independently of one another a single bond, —CH$_2$—, —COO—, —OCO—, —S—, —O—, —CH$_2$CH$_2$O—, —OCH$_2$CH$_2$—, an aromatic compound having 6 to 30 carbon atoms, or an aliphatic cyclic compound having 4 to 20 carbon atoms; and X1 to X12 independently of one another include —OH, —NH$_2$, an acrylate group, a methacrylate group, a vinyl group or

In another exemplary embodiment, a method of manufacturing a liquid crystal display includes: forming a thin film transistor on a first substrate; forming a passivation layer on the thin film transistor; disposing on the passivation layer a first electrode and a second electrode with an insulating layer interposed therebetween; applying a photoalignment agent including a copolymer of at least one of cyclobutanedianhydride and a cyclobutanedianhydride derivative, and diamine, and a crosslinking agent including an alkylene group having the formula —C$_n$H$_{2n}$—, wherein n is a natural number, on the insulating layer; pre-baking the photoalignment agent to form a pre-baked photoalignment agent; hard-baking the pre-baked photoalignment agent to form a hard-baked photoalignment agent; irradiating the hard-baked photoalignment agent with a light source thereby photoaligning the photoalignment agent; and secondarily baking the photoalignment agent irradiated with the light source, where in the application of a photoalignment agent on the insulating layer, the photoalignment agent applied on an edge portion of the insulating layer is applied in about 30 to about 70 wt %, relative to the photoalignment agent applied on a center portion of the insulating layer.

According to another exemplary embodiment, the methods of manufacturing a photoalignment layer and a liquid crystal display may minimize a step difference of a surface thickness of a photoalignment layer through adjustment of physical properties of a photoalignment agent, heat treatment conditions, and application conditions of a photoalignment agent when manufacturing a photoalignment layer, thereby having a merit of excellent reworkability of a photoalignment layer.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
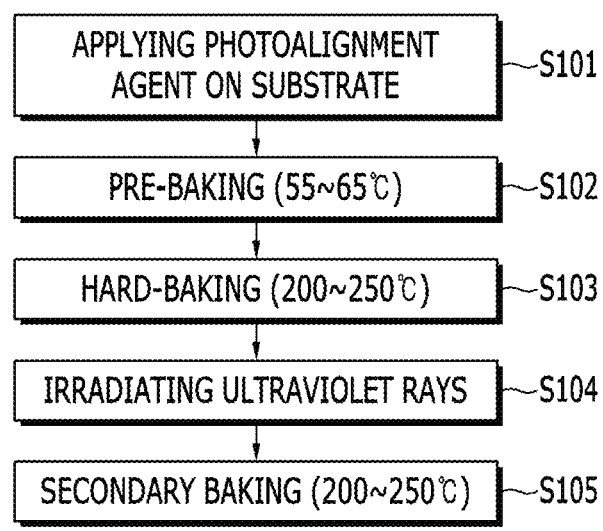
FIG. 1 is a flow chart sequentially representing an exemplary embodiment of a method of manufacturing a photoalignment layer.

The present invention will be described more fully hereinafter with reference to the accompanying drawings, in which various embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, an exemplary embodiment of a method of manufacturing a photoalignment layer will be described in detail, referring to FIG. 1.

FIG. 1 is a flow chart sequentially representing an exemplary embodiment of the method of manufacturing a photoalignment layer.

Referring to FIG. 1, an exemplary embodiment of a method of manufacturing a photoalignment layer according to the present invention includes applying a photoalignment agent on a substrate (S101), pre-baking the photoalignment agent applied on the substrate at 55-65° C. (S102), hard-baking the pre-baked photoalignment agent at 200-250° C. (S103), irradiating the hard-baked photoalignment agent with ultraviolet rays (UV) (S104), and secondarily baking the photoalignment agent irradiated with UV at 200-250° C. (S105), and each step will be described in further detail below:

First, an exemplary embodiment of a process of applying a photoalignment agent on a substrate (S101) will be described.

An exemplary embodiment of the photoalignment agent includes: (a) a copolymer of at least one of cyclobutanedianhydride (CBDA) and a cyclobutanedianhydride derivative, and diamine and (b) a crosslinking agent including an alkylene group ($-C_nH_{2n}-$, wherein n is a natural number).

Herein, the cyclobutanedianhydride may be a compound represented by following Chemical Formula 1, and the cyclobutanedianhydride derivative may be a compound represented by following Chemical Formula 2:

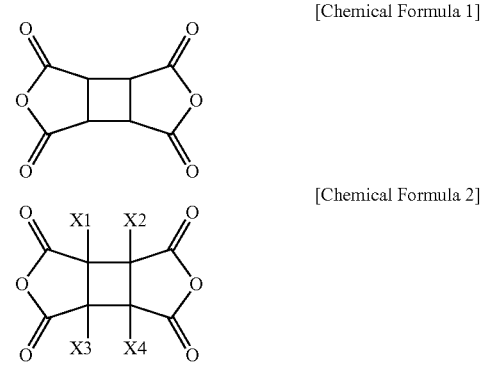

wherein X1 to X4 are independently of one another hydrogen, halogen or an alkyl group, and at least one of X1 to X4 is not hydrogen.

In an exemplary embodiment, the cyclobutanedianhydride derivative may be a compound represented by following Chemical Formulae 2-1 and 2-2:

[Chemical Formula 2-1]

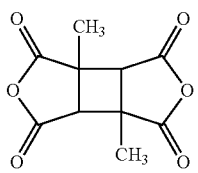

[Chemical Formula 2-2]

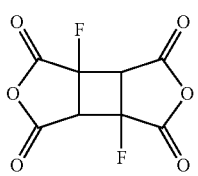

In an exemplary embodiment, the diamine may be a compound represented by following Chemical Formula 3:

[Chemical Formula 3]

The diamine is not limited to the compound represented by the above Chemical Formula 3, and in an alternative exemplary embodiment the diamine may be a compound of the above Chemical Formula 3 wherein hydrogen connected to a ring carbon is substituted by an alkyl group, halogen, sulfur, and the like, an aromatic diamine such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane, 2,2-bis[4-(4-aminophenoxy)phenyl]hexafluoropropane, alicyclic diamine such as bis(4-aminocyclohexyl)methane, bis(4-amino-3-methylcyclohexyl)methane, and aliphatic diamine such as tetramethylenediamine, hexamethylenediamine.

In an exemplary embodiment, the copolymer of the photoalignment agent may include at least one of the repeating units represented by the following Chemical Formulae 4 and 5.

[Chemical Formula 4]

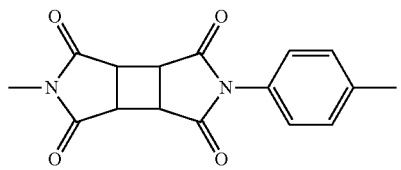

[Chemical Formula 5]

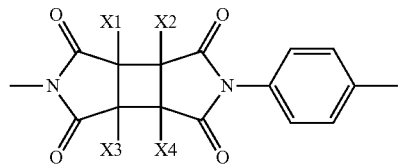

wherein X1 to X4 are independently of one another hydrogen, halogen or an alkyl group, and at least one of X1 to X4 is not hydrogen.

In an exemplary embodiment, the crosslinking agent may include at least one of the compounds represented by the following Chemical Formulae 6 to 9:

[Chemical Formula 6]

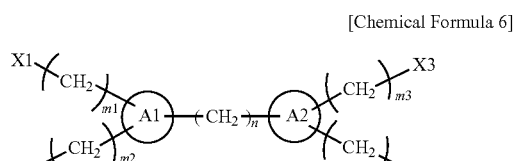

[Chemical Formula 7]

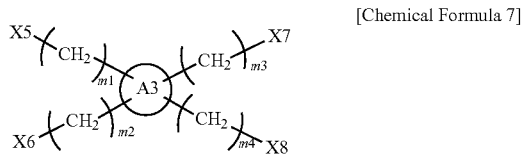

[Chemical Formula 8]

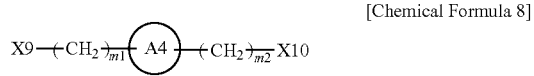

[Chemical Formula 9]

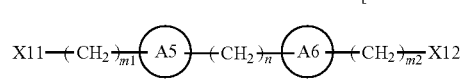

wherein n is a natural number of 2 to 11; and m1 to m4 are independently of one another a natural number of 1 to 4.

In the Chemical Formulae 6 to 9, A1 and A2 are independently of each other

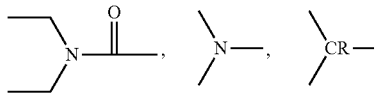

(wherein R is H or an alkyl group having 1 to 3 carbon atoms), an aromatic compound having 6 to 30 carbon atoms, or an aliphatic cyclic compound having 4 to 20 carbon atoms; A3 is

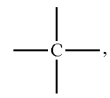

an aromatic compound having 6 to 30 carbon atoms, or an aliphatic cyclic compound having 4 to 20 carbon atoms; and A4, A5 and A6 are independently of one another a single bond, —CH$_2$—, —COO—, —OCO—, —S—, —O—, —CH$_2$CH$_2$O—, —OCH$_2$CH$_2$—, an aromatic compound having 6 to 30 carbon atoms, or an aliphatic cyclic compound having 4 to 20 carbon atoms. Herein, the aromatic compound may be, but not particularly limited to, a phenyl group, alkyl-substituted phenyl, fluorine-substituted phenyl, biphenyl, naphthalene, anthracene, or pentacene, and the aliphatic cyclic compound may be, but is not particularly limited to, cyclohexane, cyclobutane or cyclopentane.

In the Chemical Formulae 6 to 9, X1, X2, X3, X4, X5, X6, X7, X8, X9, X10, X11 and X12 independently of one another include —OH, —NH$_2$, an acrylate group, a methacrylate group, a vinyl group or

In an exemplary embodiment, the crosslinking agent may be included in an amount of about 3 wt % or more or about 10 wt % or less, relative to the total content of the photoalignment agent, specifically in an amount of about 5 wt % or more or about 7 wt % or less. In an alternative exemplary embodiment, the crosslinking agent may be included in an amount of from about 3 wt % to about 10 wt %, specifically, about 4 wt % to about 8 wt % and more specifically about 5 wt % to about 7 wt %, relative to the total content of the photoalignment agent.

In an exemplary embodiment, the crosslinking agent may include a compound represented by following Chemical Formula 10:

[Chemical Formula 10]

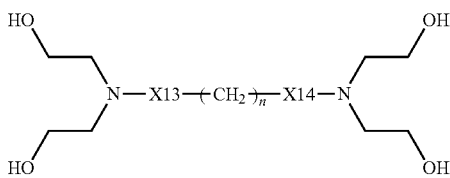

wherein n is a natural number of 3 to 11; X13 and X14 are independently of each other —(CH$_2$)$_m$—O—, —O—(CH$_2$)$_m$—, —(CH$_2$)$_m$—S—, —S—(CH$_2$)$_m$— (wherein m is a natural number of 1 to 10),

an aromatic compound having 6 to 30 carbon atoms, or an aliphatic cyclic compound having 4 to 20 carbon atoms.

In an alternative exemplary embodiment, the crosslinking agent may include a compound represented by following Chemical Formula 11:

[Chemical Formula 11]

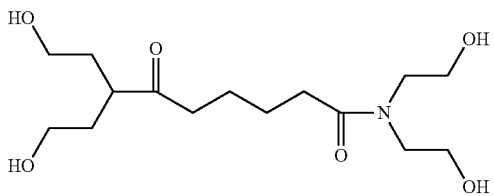

As such, since the crosslinking agent includes an alkylene group (—CH$_2$—) corresponding to a flexible group, a photoalignment layer formed by using a photoalignment agent to which the crosslinking agent is added, may minimize afterimage deterioration while improving film hardness.

In an exemplary embodiment, the photoalignment agent may be used in a form where (a) a copolymer of at least one compound of cyclobutanedianhydride (CBDA) and a cyclobutanedianhydride (CBDA) derivative and diamine, and (b) a crosslinking agent including an alkylene group (—C$_n$H$_{2n}$—, wherein n is a natural number) are mixed in a solvent.

Exemplary solvents are N-methyl-2-pyrrolidone (NMP) and 2-butyl cellosolve (BC) may be used, but is the solvents are not limited thereto. Examples of solvents are cyclopentanol; a halogen-based solvent such as 1-chlorobutane, chlorobenzene, 1,1-dichloroethane, 1,2-dichloroethane, chloroform, 1,1,2,2-tetrachloroethane; an ether-based solvent such as diethylether, tetrahydropurane, 1,4-dioxane; a ketone-based solvent such as methylethylketone (MEK), acetone, cyclohexanone; an acetate-based solvent such as propylene glycol monomethyl ether acetate (PGMEA); an ester-based solvent such as ethyl acetate; a lactone-based solvent such as γ-butyrolactone; a carbonate-based solvent such as ethylene carbonate, propylene carbonate; an amine-based solvent such as triethylamine, pyridine; a nitrile-based solvent such as acetonitrile; an amide-based solvent such as N,N'-dimethyl formamide (DMF), N,N'-dimethyl acetamide (DMAc), tetramethyl urea; a nitro-based solvent such as nitromethane, nitrobenzene; a sulfide-based solvent such as dimethyl sulfoxide (DMSO), sulfolane; and a phosphate-based solvent such as hexamethylphosphateamide, trin-butylphosphate. A mixture of one or more solvents may be used.

As such, a copolymer of at least one compound of cyclobutanedianhydride (CBDA) and a cyclobutanedianhydride (CBDA) derivative and diamine may be mixed with a solvent to form polyamic acid, and a crosslinking agent may be added to the polyamic acid to form the photoalignment agent.

In an exemplary embodiment, the photoalignment agent may have viscosity of about 27 to about 33 centipoise (cP). The viscosity of the photoalignment agent is adjustable through adjustment of concentration of the polyamic acid and the crosslinking agent.

In an exemplary embodiment, the photoalignment agent is applied on a substrate, and on an edge portion of the substrate, where only about 30 to about 70 wt %, specifically about 40 to about 60 wt % and more specifically about 45 to about 55 wt % of the photoalignment agent is applied, relative to an amount of the photoalignment agent applied on a center portion of the substrate. That is, a smaller amount of the photoalignment agent is applied on the edge portion of the substrate, as compared with the photoalignment agent applied on the center portion of the substrate.

Herein, the "edge portion of the substrate" refers to an outermost portion of about 0.5 to about 1.5 mm of the substrate intended to form a photoalignment layer thereon, and the center portion of the substrate refers to the remaining portion with the exception of the edge portion.

Next, a process of pre-baking the photoalignment agent applied on the substrate (S102) will be described.

The pre-baking may be carried out by heating the photoalignment agent applied with different amounts from each other on the center and edge portions of the substrate, using a heating source at about 55 to about 65° C. for about 60 to about 80 seconds.

This is because in case of being subjected to pre-bake at a temperature less than about 55° C., the solvent may not be sufficiently removed, or the photoalignment agent may not be evenly applied on the entire substrate, and in case of being subjected to pre-bake at a temperature above about 65° C., the photoalignment layer may be rapidly formed so as to be cured too much.

The solvent may be removed through the pre-bake, and the photoalignment agent may be applied on the entire substrate to form the photoalignment layer.

Next, a process of hard-baking the pre-baked photoalignment agent (S103) is carried out.

Hard-baking is carried out by heating the pre-baked photoalignment agent using a heat source at a temperature of about 200 to about 250° C. for about 1000 to about 1500 seconds.

In an exemplary embodiment, the photoalignment agent including a polyamic acid and a crosslinking agent, the polyamic acid may be changed into polyimide in a hard-baking process, and the crosslinking agent may undergo esterification thereby bonding to polyimide.

Next, through a process of irradiating the hard-baked photoalignment agent with polarized light (S104), the photoalignment agent may form a photoalignment layer having a certain directivity. Herein, the light may be ultraviolet rays (UV).

Herein, as the irradiated light, ultraviolet rays in a range of about 230 nm to about 380 nm may be used, specifically from about 230 nm to about 380 nm, more specifically about 240 nm to about 300 nm and even more specifically from about 250 to about 260 nm. Preferably, ultraviolet rays of about 254 nm may be used. The polarized light may have energy of about 0.20 J/cm$^2$ to about 1.0 J/cm$^2$, specifically about 0.3 to about 0.9 J/cm2, and more specifically about 0.40 J/cm$^2$ to about 0.50 J/cm$^2$.

Next, a process of secondarily baking the photoalignment agent irradiated with light (S105) may be carried out, thereby more completely curing the photoalignment layer, and rearranging photodecomposed molecules to increase alignment.

The secondary baking process may be carried out by heating using a heat source at about 200 to about 250° C. for about 1000 to about 1500 seconds.

The thus-formed photoalignment layer according to an exemplary embodiment may be formed to have a thickness ratio on a center portion and an edge portion of a substrate of about 1:1 to about 1:2.

Specifically, the photoalignment layer formed on a center portion of a substrate may have a thickness of about 700 to about 900 Å, and the photoalignment layer formed on an edge portion of a substrate may have a thickness of about 1400 to about 1800 Å, but not limited thereto, if the thickness ratio on the center portion and the edge portion of the substrate is within a range of about 1:1 to about 1:2.

Generally, if the photoalignment agent is applied evenly in a same amount on the entire substrate to form the photoalignment layer, the photoalignment agent is formed to be more gathered on an edge portion of the substrate, depending on a process step, and this causes the thickness of the photoalignment layer on the edge portion of the substrate to be formed unduly thick, when compared with that on the center portion of the substrate.

As a result of an actual measurement, it was found that if the photoalignment layer on the center portion of the substrate has a thickness of about 800 Å, the photoalignment layer on an edge portion of a substrate may be formed to have a thickness of about 2500 Å, which is three times thicker than the thickness of the photoalignment layer on a center portion of a substrate If the photoalignment layer on an edge portion of a substrate is formed unduly thick, there is a problem of being difficult to completely remove the photoalignment layer on the edge portion in a rework process of removing and reforming the photoalignment layer, due to a defect of the photoalignment layer.

If a defective photoalignment layer is not completely removed by the photoalignment layer cleaning solution in a rework process, a photoalignment layer on the edge portion which is not completely removed may contain a residual cleaning solution, and if a new photoalignment layer is reformed thereon, a display defect of the display such as border stains and an afterimage may be caused.

Thus, in an exemplary embodiment, the method of manufacturing a photoalignment layer may prevent a photoalignment layer on an edge portion of a substrate from being formed thick, especially when the manufacturing processes involves using a photoalignment agent having low viscosity, carrying out pre-baking at a somewhat low temperature, and applying a smaller amount of a photoalignment agent on an edge portion of a substrate, relative to an amount of the photoalignment agent applied on a center portion of a substrate.

By thus-forming a thickness of the photoalignment layer on the edge portion of the substrate which is thin, relative to the existing photoalignment layer, defects which may be generated in a rework process of the photoalignment layer may be prevented beforehand.

Figure 2:
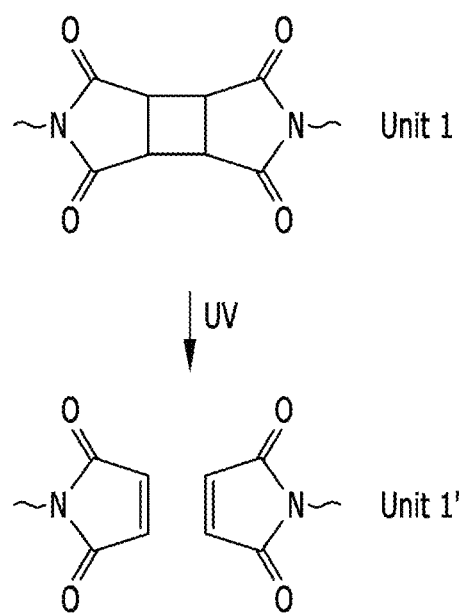
FIG. 2 is a structural formula representing an exemplary embodiment of a process of decomposing a photoalignment agent.
Figure 3:
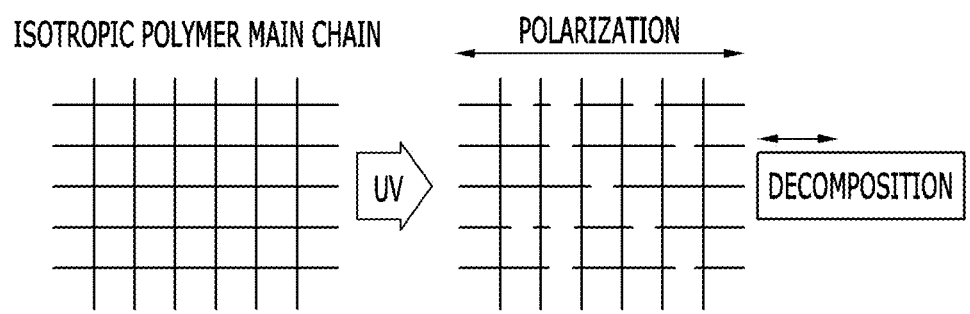
FIG. 3 is a drawing representing an exemplary embodiment of a process for changing a photoalignment layer from isotropic to anisotropic.

Referring to FIGS. 2 and 3, an exemplary embodiment of the processes of decomposing a photoalignment agent, and changing the decomposed photoalignment agent to be anisotropic, will be described in detail.

FIG. 2 is a structural formula representing an exemplary embodiment of a process of decomposing a photoalignment agent. FIG. 3 is a drawing representing an exemplary embodiment of a process of changing a photoalignment layer from isotropic to anisotropic.

Referring to FIG. 2, cyclobutanedianhydride and diamine are copolymerized to form polyamic acid, and thereafter, polyimide (Unit 1) is formed through a baking process, and maleimide (Unit 1') is formed by irradiation of polyimide with UV.

FIG. 3 represents that a polymer main chain including polyimide (Unit 1) shown in FIG. 2 is decomposed to be aligned by irradiation with polarized UV. Referring to FIG. 3, if an isotropic polymer main chain is irradiated with polarized UV, photodecomposition occurs in a polarization direction (an absorption axis direction), thereby aligning the photoalignment layer in a direction perpendicular to polarized light. Herein, if an exposure amount is too small, a decomposition rate is low so that alignment may be deteriorated. On the contrary, if an exposure amount is too large, a decomposition rate is high so that decomposition occurs not only in a polarized direction, but also in other direction, thereby deteriorating alignment.

Further, since in an exemplary embodiment a crosslinking agent included in the photoalignment agent has a flexible property, rearrangement of photodecomposed molecules may proceed well in a secondary baking process.

Figure 4B:
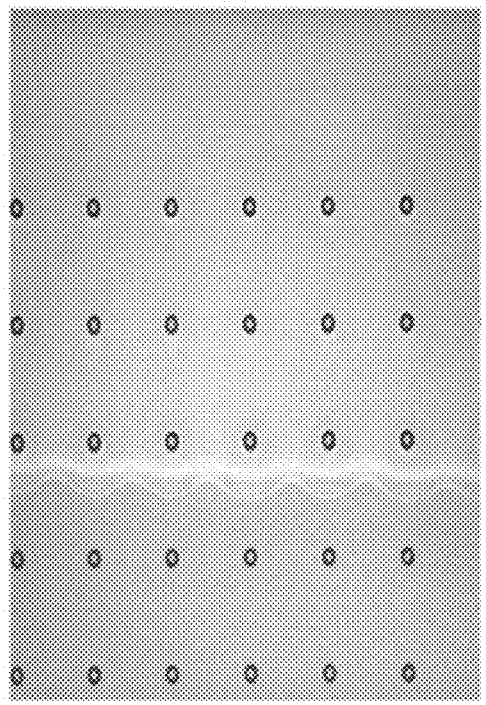
FIGS. 4(a) and 4(b) are photographs of edge portions of an exemplary embodiment of a photoalignment layer according to an example and a photoalignment layer according to a Comparative Example.
Figure 4A:
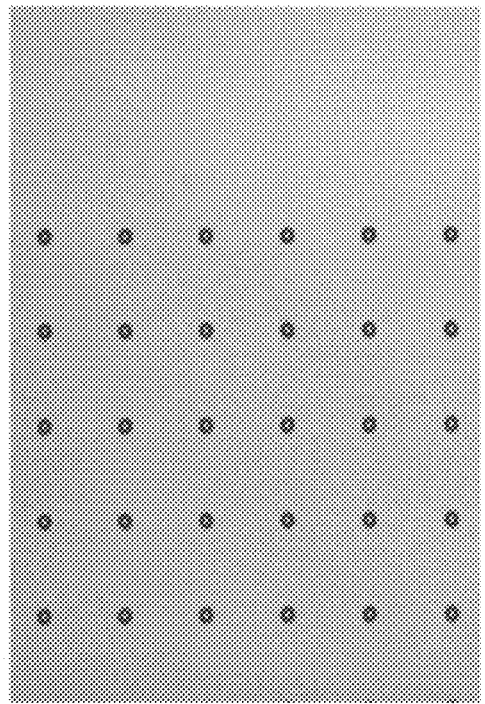

Referring to FIGS. 4(a) and 4(b), experimental results are shown comparing a thickness of a photoalignment layer manufactured by the method of manufacturing an exemplary embodiment of a photoalignment layer with a thickness of a conventional photoalignment layer.

FIGS. 4(a) and 4(b) are photographs of an exemplary embodiment of the edge portions of the photoalignment layer according to the disclosure (b) and the photoalignment layer according to a Comparative Example (a).

The Comparative Example was carried out in the same manner as the exemplary embodiment of a method of manufacturing the disclosed photoalignment layer, except that a photoalignment agent having viscosity of 40 cP is used, pre-baking is carried out at 75° C., and a uniform amount of a photoalignment agent is applied on the center portion and the edge portion of the substrate, thereby manufacturing the Comparative photoalignment layer.

As shown in FIG. 4, the photoalignment layer on an edge portion of a substrate according to the Comparative Example was formed thick thereby forming a step difference, whereas an exemplary embodiment of the photoalignment layer on an edge portion of a substrate was formed relatively thin, so that a step difference is not observed.

Hereinafter, referring to FIGS. 5 and 6, an exemplary embodiment of a liquid crystal display including the photoalignment layer will be described.

Figure 5:
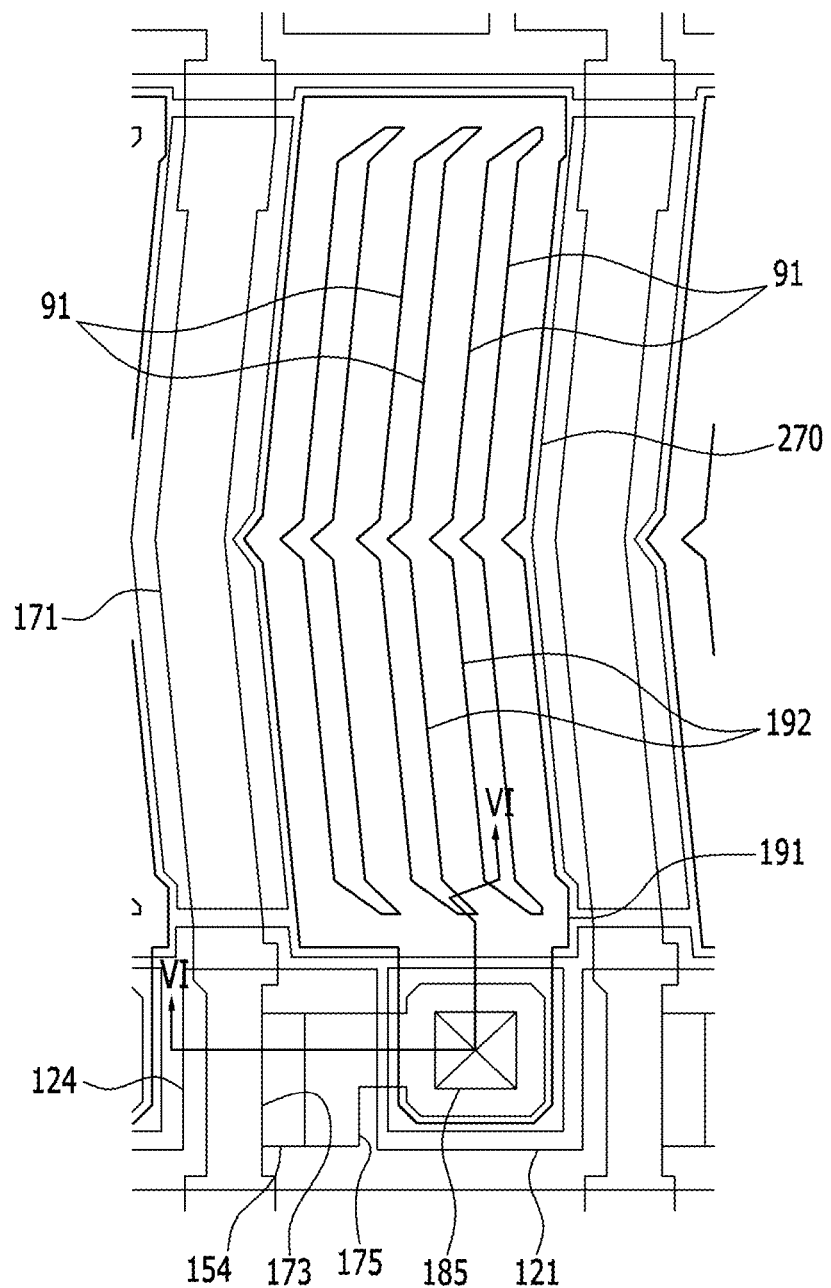
FIG. 5 is a top plan view representing an exemplary embodiment of a liquid crystal display.
Figure 6:
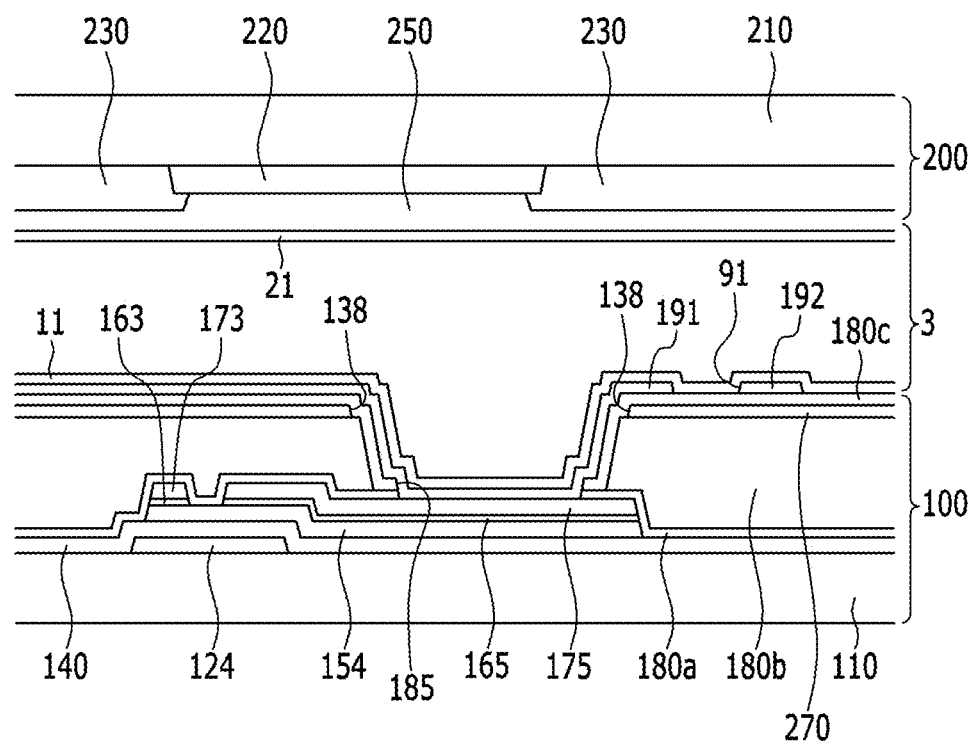
FIG. 6 is a cross-sectional view taken along the line VI-VI of FIG. 5.

FIG. 5 is a top plan view representing an exemplary embodiment of the liquid crystal display, and FIG. 6 is a cross-sectional view taken along the line VI-VI of FIG. 5.

Referring to FIGS. 5 and 6, in an exemplary embodiment, the liquid crystal display includes a lower display panel 100 and an upper display panel 200 facing each other, and a liquid crystal layer 3 inserted there between.

First, the lower display panel 100 will be described

On a first substrate 110 which may be manufactured from transparent glass, plastic or the like, a gate conductor including a gate line 121 is formed.

The gate line 121 may include a wide end portion (not shown) for connection to a gate and other layer or an external driving circuit. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), and the like. However, the gate line 121 may have a multilayer structure including at least two conductive layer having different physical properties.

On the gate line 121, a gate insulating layer 140 that contains silicon nitride (SiNx), silicon oxide (SiOx) or the like is formed. The gate insulating layer 140 may have a multilayer structure including at least two insulating layers having different physical properties.

On the gate insulating layer 140, a semiconductor layer 154 made of an amorphous silicon, a polysilicon or the like is disposed. The semiconductor layer 154 may be formed of an oxide semiconductor.

On the semiconductor layer 154, ohmic contacts 163 and 165 are formed. The ohmic contacts 163 and 165 may be made of a material such as n+ hydrogenated amorphous silicon to which an n-type impurity such as phosphorus is doped at high concentration, or made of silicide. The ohmic contacts 163 and 165 may be paired to be disposed on a semiconductor layer 154. If the semiconductor layer 154 is an oxide semiconductor, the ohmic contacts 163 and 165 may be omitted.

On the ohmic contacts 163 and 165 and the gate insulating layer 140, a data line 171 including a source electrode 173, and a data conductor including a drain electrode 175 are formed.

The data line 171 includes a wide end portion (not shown) for connection to other layer or an external driving circuit.

The data line 171 transmits a data signal, and is stretched mainly in a vertical direction to intersect with a gate line 121.

Herein, the data line 171 may have a flexure portion having a flexed shape for obtaining a maximum transmittance of a liquid crystal display, and the flexure portions may meet each other in a middle region of a pixel area to form a V-shape.

A source electrode 173 is a part of the data line 171, and disposed on the same line as the data line 171. A drain electrode 175 is formed to be stretched out parallel to the source electrode 173. Therefore, the drain electrode 175 is parallel to a part of the data line 171.

The gate electrode 124, the source electrode 173 and the drain electrode 175 form one thin film transistor (TFT) together with a semiconductor layer 154, and a channel of the thin film transistor is formed on a semiconductor layer 154 portion between the source electrode 173 and the drain electrode 175.

In an exemplary embodiment, the liquid crystal display includes the source electrode 173 disposed on the same line as the data line 171, and the drain electrode 175 stretched out parallel to the data line 171, thereby broadening a width of the thin film transistor without broadening an area occupied by the data conductor, and accordingly, increasing an aperture ratio of the liquid crystal display.

In an exemplary embodiment, the data line 171 and the drain electrode 175 are made of a refractory metal such as molybdenum, chromium, tantalum and titanium, or an alloy thereof, and the data line 171 and the drain electrode 175 may have a multilayer structure including a refractory metal layer (not shown) and a low resistant conductive layer (not shown). The multilayer structure is exemplified by a double layer of a chromium or molybdenum (alloy) lower layer and an aluminum (alloy) upper layer, and a triple layer of a molybdenum (alloy) lower layer, an aluminum (alloy) intermediate layer and a molybdenum (alloy) upper layer.

On exposed parts of data conductors 171, 173, and 175, a gate insulating layer 140, and a semiconductor 154, a first passivation layer 180a is disposed. The first passivation layer 180a may consist of an organic insulating material, an inorganic insulating material and the like.

On the first passivation layer 180a, a second passivation layer 180b is formed. The second passivation layer 180b may consist of an organic insulator.

The second passivation layer 180b may be a color filter. If the second passivation layer 180b is a color filter, the second passivation layer 180b may inherently display one of primary colors, and an example of the primary color is three primary colors such as red, green and blue, or yellow, cyan, magenta, or the like. Though not shown, the color filter may further include a color filter displaying a mixed color of primary colors or white, in addition to a primary color. If the second passivation layer 180b is a color filter, a color filter 230 may be omitted in an upper display panel 200 described below. Thus, in an alternative exemplary embodiment, the second passivation layer 180b is formed of an organic insulating material, and a color filter (not shown) may be formed between a first passivation layer 180a and the second passivation layer 180b.

With regard to the second passivation layer 180b, a common electrode 270 is disposed thereon. The common electrode 270 being in a planar shape may be formed in whole on an entire substrate 110, and has an opening 138 disposed on a region corresponding to a peripheral of a drain electrode 175. That is, the common electrode 270 may have a planar shape in a plate form.

The common electrodes 270 disposed in adjacent pixels may be connected to each other, thereby receiving a certain level of common voltage, supplied from the outside of a display area.

With regard to the common electrode 270, an insulating layer 180c is disposed thereon. The insulating layer 180c may consist of an organic insulating material, an inorganic insulating material, or the like.

With regard to the insulating layer 180c, a pixel electrode 191 is disposed thereon. The pixel electrode 191 includes a curved edge being almost parallel to the flexure portion of the data line 171. The pixel electrode 191 has a plurality of cutouts 91, and includes a plurality of branch electrodes 192 disposed between neighboring cutouts 91.

The pixel electrode 191 is a first field generating electrode or a first electrode, and the common electrode 270 is a second field generating electrode or a second electrode. The pixel electrode 191 and the common electrode 270 may form a fringe field and the like.

On the first passivation layer 180a, the second passivation layer 180b and the insulating layer 180c, a first contact hole 185 exposing a drain electrode 175 is formed. The pixel electrode 191 is physically and electrically connected to the drain electrode 175 through a contact hole 185, so that voltage is applied thereto from a drain electrode 175.

On the pixel electrode 191 and the insulating layer 180c, a first alignment layer 11 is formed. The first alignment layer 11 includes a photoalignment layer.

In an exemplary embodiment, the first alignment layer 11 includes the photoalignment layer as described above.

An upper display panel 200 will be described below.

On a second substrate 210 made of transparent glass, plastic or the like, a light blocking member 220 is formed. The light blocking member 220 is also called, a black matrix, and prevents light leakage.

On the second substrate 210, a plurality of color filters 230 are also formed. If a second passivation layer 180b of a lower display panel 100 is a color filter, or a color filter is formed on a lower display panel 100, a color filter 230 on an upper display panel 200 may be omitted. Further, a light blocking member 220 of an upper display panel 200 may be also formed on a lower display panel 100.

On the color filter 230 and the light blocking member 220, an overcoat 250 is formed. The overcoat 250 may be made of an (organic) insulator, and prevents the color filter 230 from being exposed and provides a flat surface. In an alternative embodiment, the overcoat 250 may be omitted.

On the overcoat 250, a second alignment layer 21 is formed. The second alignment layer 21 may be formed with the same material in the same manner as the first alignment layer 11 as described above.

In an exemplary embodiment, a liquid crystal layer 3 may include a liquid crystal having negative dielectric anisotropy or positive dielectric anisotropy.

The liquid crystal of the liquid crystal layer 3 may be arranged so that its major axis direction is parallel to display panels 100 and 200.

A pixel electrode 191 receives data voltage from a drain electrode 175, and a common electrode 270 receives a certain level of common voltage from a common voltage applying unit disposed in the outside of a display area.

The pixel electrode 191 and the common electrode 270 which are field generating electrodes generate electric field, so that a liquid crystal of a liquid crystal layer 3 disposed on the two field generating electrodes 191 and 270 may rotate in a vertical or parallel direction to the direction of an electric field. Depending on the thus-determined rotating direction of a liquid crystal molecule, polarization of light passing the liquid crystal layer is varied.

As such, by forming two field generating electrodes 191 and 270 on one display panel 100, the transmittance of the liquid crystal display may be increased, and a wide viewing angle may be implemented.

According to an exemplary embodiment of the liquid crystal, a common electrode 270 has a planar shape in a surface form, a pixel electrode 191 has a plurality of branch electrodes, whereas according to the liquid crystal display according to another exemplary embodiment of the present invention, pixel electrode 191 has a planar shape in a surface form, and a common electrode 270 has a plurality of branch electrodes.

The methods of manufacturing a photoalignment layer and a liquid crystal display may be applied to all other applications where two field generating electrodes overlap each other with an insulating layer interposed there between on a first substrate 110, a first field generating electrode formed under the insulating layer has a planar shape in a surface form, and a second field generating electrode formed on the insulating layer has a plurality of branch electrodes.

As described above, exemplary embodiments of the methods of manufacturing a photoalignment layer and a liquid crystal display may minimize a step difference of a surface thickness of the photoalignment layer through adjustment of the physical properties of a photoalignment agent, heat treatment conditions and application conditions of a photoalignment agent, when manufacturing the photoalignment layer, and this may lead excellent reworkability of the photoalignment layer. Hereinbefore, the preferred exemplary embodiments of the present invention are described in detail, but the scope of the present invention is not limited thereto, and various modifications and improved forms thereof by a person of an ordinary skill in the art using a basic concept of the present invention as defined in the appended claims, also belong to the scope of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a photoalignment layer comprising:

applying a photoalignment agent comprising a copolymer of at least one of cyclobutanedianhydride and a cyclobutanedianhydride derivative, diamine, and a crosslinking agent comprising an alkylene group having a formula —$C_nH_{2n}$—, wherein n is a natural number of 1 or more, on a substrate, pre-baking the photoalignment agent applied on the substrate to form a pre-baked photoalignment agent, hard-baking the pre-baked photoalignment agent to form a hard-baked photoalignment agent, irradiating the hard-baked photoalignment agent with a light source thereby photoaligning the photoalignment agent, and secondarily baking the photoalignment agent irradiated with the light source, wherein in the applying of the photoalignment agent on the substrate, the photoalignment agent applied on an edge portion of the substrate is applied in about 30 to about 70 wt %, relative to the photoalignment agent applied on a center portion of the substrate.

2. The method of claim 1, wherein:
the photoalignment agent further includes an organic solvent, and
is formed to have viscosity of about 27 to about 33 centipoise.

3. The method of claim 2, wherein:
the pre-baking is carried out by heat treatment of the photoalignment agent at about 55 to about 65° C. for about 60 to about 80 seconds.

4. The method of claim 3, wherein:
the hard-baking is carried out by heat treatment of the photoalignment agent at about 200 to about 250° C. for 1000-1500 seconds.

5. The method of claim 4, wherein:
the irradiating with a light source is carried out by using ultraviolet rays in a wavelength range of about 230 nanometers to about 380 nanometers.

6. The method of claim 5, wherein:
the secondary baking is carried out by heat treatment at about 200 to about 250° C. for about 1000 to about 1500 seconds.

7. The method of claim 3, wherein:
a thickness ratio of the photoalignment layer on the center portion and the edge portion of the substrate is about 1:1 to about 1:2.

8. The method of claim 7, wherein:
the photoalignment layer of the center portion of the substrate has a thickness of about 700 to about 900 Å.

9. The method of claim 8, wherein:
the photoalignment layer of the edge portion of the substrate has a thickness of about 1400 to about 1800 Å.

10. The method of claim 7 further comprising:
removing the photoalignment layer using a cleaning solution of the photoalignment layer, and reforming the photoalignment layer.

11. The method of claim 3, wherein:
the cyclobutanedianhydride includes a compound represented by following Chemical Formula 1, and the cyclobutanedianhydride derivative comprises a compound represented by following Chemical Formula 2:

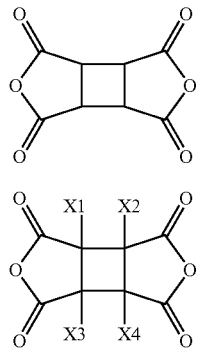

[Chemical Formula 1]

[Chemical Formula 2]

wherein X1 to X4 are independently of one another hydrogen, halogen or an alkyl group, and at least one of X1 to X4 is not hydrogen.

12. The method of claim 11, wherein:
the diamine comprises a compound represented by following Chemical Formula 3:

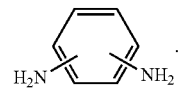

[Chemical Formula 3]

13. The method of claim 12, wherein:
the copolymer comprises polyamic acid.

14. The method of claim 13, wherein:
the crosslinking agent is selected from at least one of compounds represented by following Chemical Formulae 6 to 9:

[Chemical Formula 6]

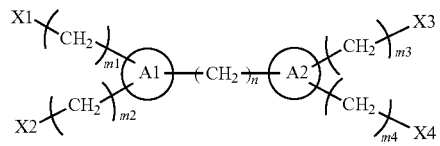

[Chemical Formula 7]

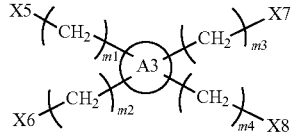

[Chemical Formula 8]

[Chemical Formula 9]

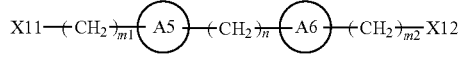

wherein n is a natural number of 2 to 11; m1 to m4 are independently of one another a natural number of 1 to 4; A1 and A2 are independently of each other

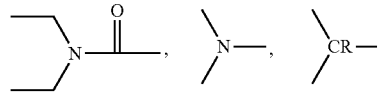

wherein R is H or an alkyl group having 1 to 3 carbon atoms, an aromatic compound having 6 to 30 carbon atoms, or an aliphatic cyclic compound having 4 to 20 carbon atoms; A3 is

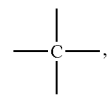

an aromatic compound having 6 to 30 carbon atoms, or an aliphatic cyclic compound having 4 to 20 carbon atoms; A4, A5 and A6 are independently of one another a single bond, —CH$_2$—, —COO—, —OCO—, —S—, —O—, —CH$_2$CH$_2$O—, —OCH$_2$CH$_2$—, an aromatic compound having 6 to 30 carbon atoms, or an aliphatic cyclic compound having 4 to 20 carbon atoms; and X1 to X12 independently of one another include —OH, —NH$_2$, an acrylate group, a methacrylate group, a vinyl group or

15. A method of manufacturing a liquid crystal display comprising:
 forming a thin film transistor on a first substrate,
 forming a passivation layer on the thin film transistor,
 disposing on the passivation layer a first electrode and a second electrode with an insulating layer interposed therebetween,
 applying a photoalignment agent including a copolymer of at least one of cyclobutanedianhydride and a cyclobutanedianhydride derivative, diamine, and a crosslinking agent including an alkylene group having a formula —C$_n$H$_{2n}$—, wherein n is a natural number of 1 or more, on the insulating layer,
 pre-baking the photoalignment agent to form a pre-baked photoalignment agent,
 hard-baking the pre-baked photoalignment agent to form a hard-baked photoalignment agent,
 irradiating the hard-baked photoalignment agent with a light source thereby photoaligning the photoalignment agent, and
 secondarily baking the photoalignment agent irradiated with the light source,
 wherein in the applying of the photoalignment agent on the insulating layer,
 the photoalignment agent applied on an edge portion of the insulating layer is applied in about 30 to about 70 wt %, relative to the photoalignment agent applied on a center portion of the insulating layer.

16. The method of claim 15, wherein:
 the photoalignment agent is formed to have viscosity of about 27 to about 33 centipoise.

17. The method of claim 16, wherein:
 the pre-baking is carried out by heat treatment of the photoalignment agent at a temperature of about 55 to about 65° C. for about 60 to about 80 seconds.

18. The method of claim 17, wherein:
 a thickness ratio of the photoalignment layer on the center portion and the edge portion of the first substrate is about 1:1 to about 1:2.

19. The method of claim 18, wherein:
 the photoalignment layer of the center portion of the first substrate has a thickness of about 700 to about 900 Å, and
 the photoalignment layer of the edge portion of the first substrate has a thickness of about 1400 to about 1800 Å.

20. The method of claim 18 further comprising:
 removing the photoalignment layer using a cleaning solution of the photoalignment layer, and
 reforming the photoalignment layer.

* * * * *